(12) United States Patent
Kim

(10) Patent No.: US 8,399,133 B2
(45) Date of Patent: Mar. 19, 2013

(54) ELECTRODE ASSEMBLY AND SECONDARY BATTERY HAVING THE SAME

(75) Inventor: Jinhee Kim, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 92 days.

(21) Appl. No.: 12/338,145

(22) Filed: Dec. 18, 2008

(65) Prior Publication Data

US 2009/0181300 A1    Jul. 16, 2009

(30) Foreign Application Priority Data

Jan. 11, 2008  (KR) .................. 10-2008-0003489

(51) Int. Cl.
```
H01M 4/58      (2010.01)
H01M 4/64      (2006.01)
H01M 2/16      (2006.01)
H01M 6/12      (2006.01)
```
(52) U.S. Cl. ............... 429/232; 429/162; 429/218.1; 429/247; 429/249; 429/251

(58) Field of Classification Search ............. 429/218.1, 429/247, 94, 185, 232, 249, 251
See application file for complete search history.

(56) References Cited

U.S. PATENT DOCUMENTS

| | | | | |
|---|---|---|---|---|
| 5,795,679 A | * | 8/1998 | Kawakami et al. | 429/218.1 |
| 5,914,094 A | * | 6/1999 | Sun et al. | 423/594.4 |
| 6,001,761 A | * | 12/1999 | Hata et al. | 501/103 |
| 7,422,825 B2 | * | 9/2008 | Inoue et al. | 429/246 |
| 2006/0188785 A1 | * | 8/2006 | Inoue et al. | 429/246 |
| 2006/0194116 A1 | | 8/2006 | Suzuki et al. | |
| 2006/0246355 A1 | | 11/2006 | Min et al. | |
| 2007/0218362 A1 | | 9/2007 | Nagasaki et al. | |
| 2008/0241674 A1 | | 10/2008 | Kim | |
| 2008/0299461 A1 | | 12/2008 | Kim | |
| 2009/0325074 A1 | | 12/2009 | Fukumoto et al. | |

FOREIGN PATENT DOCUMENTS

| | | |
|---|---|---|
| CN | 1947287 A | 4/2007 |
| EP | 1 146 576 | 10/2001 |
| EP | 1 667 254 | 6/2006 |
| EP | 2 048 736 | 4/2009 |
| JP | 10-223195 | 8/1998 |
| JP | 2001-110454 | 4/2001 |
| JP | 2005-327680 A | 11/2005 |
| JP | 2007-157723 | 6/2007 |

(Continued)

OTHER PUBLICATIONS

English-language abstract of KR 10-2006-0053645.

(Continued)

*Primary Examiner* — Patrick Ryan
*Assistant Examiner* — Julian Anthony
(74) *Attorney, Agent, or Firm* — Knobbe Martens Olson & Bear LLP

(57) ABSTRACT

An electrode assembly of a secondary battery includes a cathode including a cathode active material layer, an anode including an anode active material layer, and a ceramic coating layer formed on at least one of surfaces of the cathode and anode that face each other. The ceramic coating layer includes a ceramic powder and a binder. The specific surface area of the ceramic powder is more than 1.5 $m^2/g$ and less than 15.0 $m^2/g$, and, in the particle size distribution of the ceramic powder, the D10 value is more than 0.05 μm and the D90 value is less than 3.0 μm.

19 Claims, 2 Drawing Sheets

FOREIGN PATENT DOCUMENTS

| | | |
|---|---|---|
| JP | 2008-027634 | 2/2008 |
| KR | 10-2002-0019608 A | 3/2002 |
| KR | 10-2005-0058489 | 6/2005 |
| KR | 10-0659820 | 12/2006 |
| KR | 10-2007-0034038 A | 3/2007 |
| WO | WO 2005029614 A1 | 3/2005 |

OTHER PUBLICATIONS

Chinese Office Action issued for Application No. 200910000350.7 dated Oct. 26, 2010, 12 pages.

* cited by examiner

ELECTRODE ASSEMBLY AND SECONDARY BATTERY HAVING THE SAME

CROSS-REFERENCE TO RELATED APPLICATIONS

This application claims the benefit of Korean Patent Application No. 2008-3489, filed Jan. 11, 2008 in the Korean Intellectual Property Office, the disclosure of which is incorporated herein by reference.

BACKGROUND OF THE INVENTION

1. Field of the Invention

Aspects of the present invention relate to a secondary battery, and more particularly, to an electrode assembly and a secondary battery having the same that improves thermal stability significantly by including a ceramic coating layer.

2. Description of the Related Art

Generally, a secondary battery can be reused repeatedly by charging, as opposed to a disposable battery that can be used only once. The secondary battery is generally used as a main power supply of portable devices for communication, information processing and audio/video. Recently, great interest has been concentrated on the secondary battery, and the secondary battery has been developed rapidly because it has an ultra-light weight, high energy density, high output voltage, a low self-discharging rate, environment-friendliness, and a long lifetime as a power supply.

Secondary batteries are divided into nickel-hydrogen (Ni-MH) batteries and lithium ion (Li-ion) batteries according to the electrode active material. Particularly, lithium ion batteries can be also divided, according to the kind of the electrolyte used, into batteries using a liquid electrolyte, batteries using a solid polymer electrolyte or batteries using a gel phase electrolyte. In addition, lithium ion batteries may be divided into a can type and a pouch type according to a shape of a container receiving an electrode assembly.

The lithium ion battery can provide an ultra-lightweight battery because its energy density per weight is much higher than that of a disposable battery. Average voltages per cell of the lithium ion battery and average voltages of other secondary batteries, such as a NiCad battery or a nickel-hydrogen battery, are respectively 3.6V and 1.2 V. Thus, the lithium ion battery is three times more compact than other secondary batteries. In addition, the self-discharging rate of the lithium ion battery is less than 5% a month at 20° C., with corresponds to about 1/3 of the self-discharging rate of the NiCad battery or the nickel-hydrogen battery. The lithium ion battery is environment-friendly because it does not use heavy metals such as cadmium (Cd) or mercury (Hg), and has an advantage in that it is rechargeable more than 1000 times under normal conditions. Thus, the lithium ion battery has been developed rapidly to keep pace with recent developments in information and communication technologies due to the advantages as described above In conventional secondary batteries, a bare cell is formed by providing an electrode assembly including a cathode plate, an anode plate and a separator in a can made of aluminum or aluminum alloy, finishing an upper opening of the can with a cap assembly, and injecting an electrolytic solution into the can, and sealing the can.

The separator is a polyolefin type film separator that is provided to prevent an electrical short between the cathode and anode plates. In addition, the separator itself functions as a safety device preventing overheating of the battery. In particular, micro-holes of the separator are closed when the battery temperature is suddenly increased for any reason, such as, for example, external heat transfer. However, the separator may be damaged by an increase in battery temperature that continues for a prolonged period of time.

Additionally, if the battery temperature is not decreased by a current shutdown, the separator may be continuously melted by already generated heat, even though micro-holes of the separator are closed, when large current flows in the secondary battery in a short time due to the high capacity of the battery. Thus, a possibility of an electrical short caused by damage of the separator is increased To solve the thermal problem of the film separator, there has been proposed a method of improving protection against internal shorts by forming a ceramic coating layer on an electrode by coating a paste formed of ceramic powder, a binder and a solvent onto the electrode.

However, to achieve the desired thermal stability of the secondary battery as described above it is desirable that the ceramic coating layer should be uniformly coated without defects. In other words, it is desirable that the ceramic powder be coated to a uniform thickness on the electrode active material without defects such as uncoated parts, pin holes and cracks.

If there are the uncoated parts, pin holes and cracks in the ceramic coating layer, current may be concentrated to the defective portion and the internal short may be generated. The secondary battery may be catch on fire or explode due to thermal decomposition of the electrode active material and decomposition of the electrolytic solution by initial heat generated by a short.

SUMMARY OF THE INVENTION

Aspects of the present invention provide an electrode assembly and a secondary battery having the same that can improve thermal stability prominently by including a ceramic coating layer.

Additional and/or other advantages, objects and features of the invention will be set forth in part in the description which follows and in part will become apparent to those having ordinary skill in the art upon examination of the following or may be learned from practice of the invention.

According to one embodiment of the present invention, there is provided an electrode assembly, which includes: a cathode comprising a cathode active material layer; an anode comprising an anode active material layer; and a ceramic coating layer formed on at least one of surfaces of the cathode and anode that face each other. The ceramic coating layer includes a ceramic powder and a binder, wherein the specific surface area of the ceramic powder is more than 1.5 $m^2/g$ and less than 15.0 $m^2/g$.

According to an aspect of the present invention, the ceramic coating layer may be formed by coating a ceramic paste comprising the ceramic powder, the binder and solvent onto the cathode or anode. The viscosity of the ceramic paste may be 20 to 3,000 cps. The thickness distribution of the ceramic coating layer dried after coating may be less than 10%.

According to an aspect of the present invention, the ceramic powder may be at least one selected from alumina, silica, zirconia, zeolite, magnesia, titanium oxide and barium titanate, and the binder may be an acrylate group rubber.

According to another embodiment of the present invention, there is provided an electrode assembly, which includes: a cathode comprising a cathode active material layer; an anode comprising an anode active material layer; and a ceramic coating layer formed on at least one of surfaces of the cathode and anode that face each other. The ceramic coating layer includes a ceramic powder and a binder, wherein particle size distribution of the ceramic powder may have a D10 value of more than 0.05 μm and a D90 value of less than 3.0 μm.

According to an aspect of the present invention, the ceramic coating layer may be formed by coating a ceramic paste made by mixing the ceramic powder, the binder and a solvent onto the cathode or anode. The viscosity of the ceramic paste may be 20 to 3,000 cps. The thickness distribution of the ceramic coating layer dried after coating may be less than 10%.

According to an aspect of the present invention, the ceramic powder may be at least one selected from alumina, silica, zirconia, zeolite, magnesia, titanium oxide and barium titanate, and the binder may be an acrylate group rubber.

According to a still another embodiment of the present invention, there is provided an electrode assembly, which includes: a cathode comprising a cathode active material layer; an anode comprising an anode active material layer; and a ceramic coating layer formed on at least one of surfaces of the cathode and anode that face each other. The ceramic coating layer includes a ceramic powder and a binder, wherein the specific surface area of the ceramic powder is more than 1.5 $m^2/g$ and less than 15.0 $m^2/g$, and the particle size distribution of the ceramic powder has a D10 value of more than 0.05 μm and a D90 value of less than 3.0 μm.

According to a still another embodiment of the present invention, there is provided a secondary battery, which includes: an electrode assembly; a can that receives the electrode assembly; and a cap assembly that seals the can, where the electrode assembly is an electrode assembly as described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will be apparent and more readily appreciated from the following description of the embodiments, taken in conjunction with the accompanying drawings of which.

DETAILED DESCRIPTION OF THE EMBODIMENTS

Figure 1:
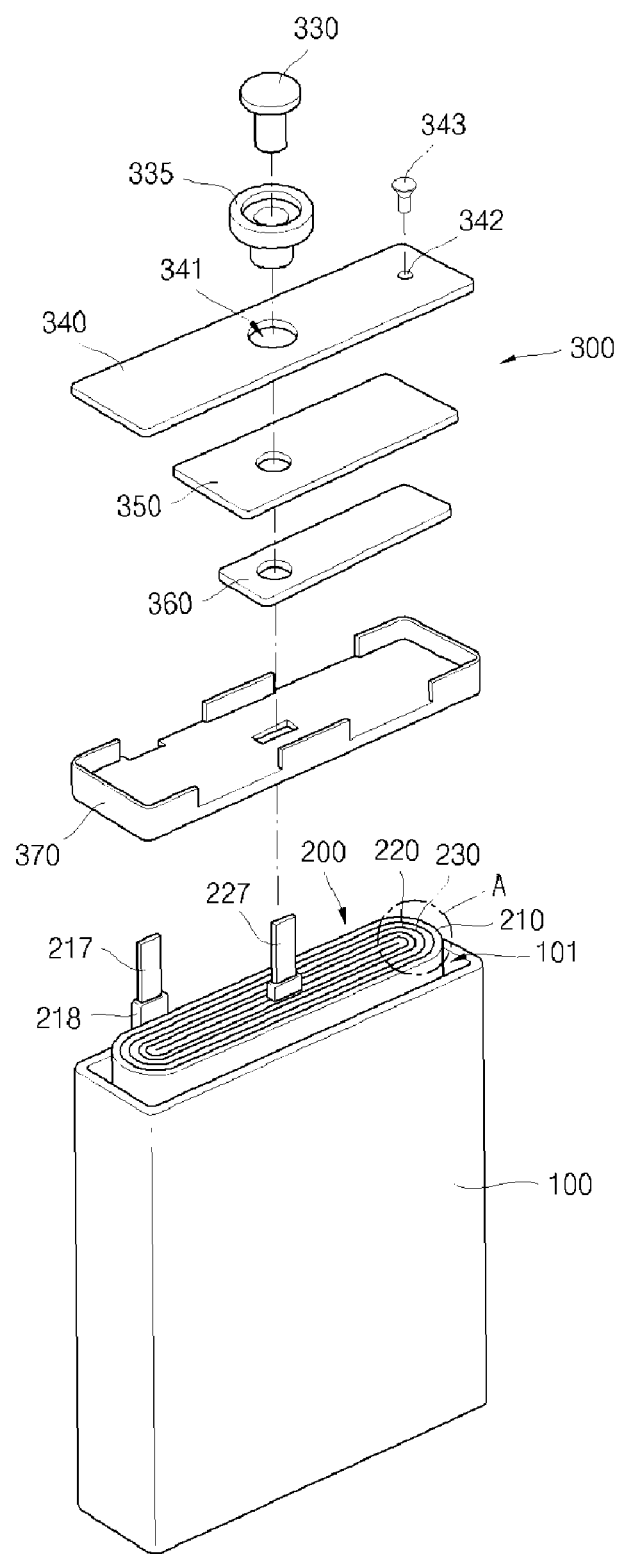
FIG. 1 is an exploded perspective view illustrating a secondary battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
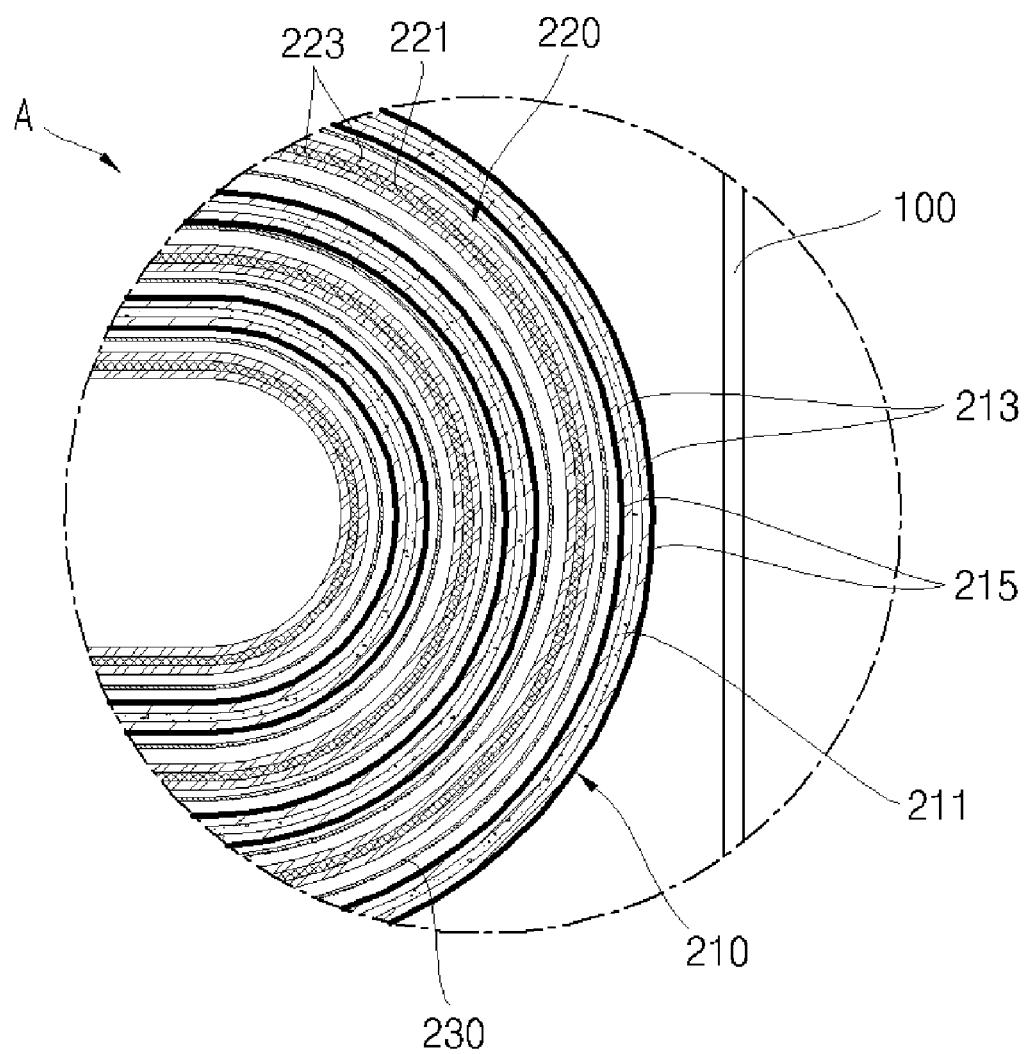
FIG. 2 is a magnified view illustrating 'A' region of FIG. 1.

FIG. 1 shows an exploded perspective view illustrating a secondary battery according to one exemplary embodiment of the present invention, and FIG. 2 shows a magnified view illustrating 'A' region of FIG. 1.

Referring to FIGS. 1 and 2, the secondary battery includes a can 100, an electrode assembly 200 received in the can and including a ceramic coating layer 215, and a cap assembly 300 sealing an opening of the can. It is to be understood that although a rectangular secondary battery is shown in FIGS. 1 and 2, a battery according to aspects of the present invention may have other shapes and configurations.

The can 100 may be made of metal having a roughly rectangular parallelepiped shape, but is not limited thereto. The can 100 may function as a terminal in itself. In addition, the can 100 may include a radiant heat area expansion unit (not shown) of a predetermined shape for increasing radiant heat area so as to easily discharge heat generated in the can to the outside. The can 100 includes an upper opening 101 through which the electrode assembly 200 is received.

The cap assembly 300 includes an electrode terminal 330, a cap plate 340, an insulation plate 350, and a terminal plate 360. The cap assembly 300 is attached to the upper opening 101 of the can 100 while being insulated from the electrode assembly 200 by a separate insulation case 370, thereby sealing the can 100.

The electrode terminal 330 functions as a cathode terminal or an anode terminal by being connected to a cathode tab 217 of a cathode to be described later or an anode tab 227 of an anode 220 to be described later.

The cap plate 340 is formed of a metal plate having a size and shape corresponding to the upper opening 101 of the can 100. A terminal hole 341 of a predetermined size is formed in the middle of the cap plate 340. The electrode terminal 330 is inserted into the terminal hole 341. When the electrode terminal 330 is inserted into the terminal hole 341, a tube type gasket 335 that contacts an outer surface of the electrode terminal 330 is also inserted into the terminal hole 341. An electrolytic solution injection hole 342 may be formed in a predetermined size at one side of the cap plate 340, and a safety vent (not shown) may be formed at the other side. The safety vent may be formed integrally with the cap plate 340 by providing a reduced thickness portion of a sectional surface of the cap plate 340. After the cap assembly 320 is attached to the upper opening 101, the electrolytic solution is injected through the electrolytic solution injection hole 342. Then, the electrolytic solution injection hole 342 is sealed by a stopper 343.

The electrode assembly 200 may include a cathode 210, an anode 220 and a ceramic coating layer 215 formed on at least one of surfaces of the cathode and anode that face to each other, which are wound in a jelly-roll type. In addition, the secondary battery may further include a separator 230 interposed between the cathode 210 and anode 220 and wound together as shown in the drawing. However, the separator 230 may be omitted.

The cathode 210 includes a cathode collector 211 made of aluminum foil and an cathode active material layer 213 containing a lithium oxide, such as, for example, $LiCoO_2$, coated on both surfaces of the cathode collector 211 as a main component. Cathode uncoated parts (not shown) are respectively formed at both ends of the cathode collector 211. The cathode uncoated parts are regions on one or both surfaces of the cathode 210 where the cathode active material layer 213 is not formed. A cathode tab 217 is provided on the cathode uncoated part (not shown). An insulation tape 218 is wound on a part of the cathode tab 217 that extends from the electrode assembly 200 to prevent an electrical short.

The anode 220 includes an anode collector 221 made of thin copper foil and an anode active material layer 223 containing a carbonaceous material such as, for example, graphite coated on both surfaces of the anode collector 221 as a main component. Anode uncoated parts (not shown) are respectively formed at both ends of the anode collector 221, where the anode uncoated parts are regions on one or both surfaces of the anode 220 where the anode active material layer 223 is not formed. An anode tab 227 is provided on the anode uncoated part (not shown). An insulation tape is wound on a part of the anode tab 227 that extends the electrode assembly 200 to prevent an electrical short.

The ceramic coating layer 215 is formed by coating a ceramic paste made by mixing binder and solvent with ceramic powder onto at least one of the surfaces of the cathode and anode that face to each other.

For example, in the jelly-roll type electrode assembly formed by stacking and winding two electrodes, the ceramic coating layer 215 may be formed on at least one of electrode surfaces of the cathode and anode that face to each other, i) by forming the ceramic coating layer on each outer surface of the two electrodes, or ii) by forming the ceramic coating layer on each inner surface of the two electrodes, or iii) by forming the ceramic coating layer on both inner and outer surfaces of any one of the two electrodes.

Referring to FIG. 2, as an example for the case iii) as described above, the ceramic coating layer 215 is formed on both inner and outer surfaces of the cathode 210, but aspects of the present invention are not limited thereto.

The ceramic coating layer 215 may function as a film separator such that a film separator 230 made from polypropylene (PP) or polyethylene (PE) may be omitted.

The ceramic powder in the ceramic coating layer 215 includes at least one selected from a group including alumina, silica, zirconia, zeolite, magnesia, titanium oxide and barium titanate. Decomposition temperatures of these materials are higher than 1,000° C. Thus, thermal stability of the secondary battery formed by using the ceramic coating layer 215 is prominently improved.

A polyolefin type film separator 230 has a problem that it contracts or melts at a high temperature, such as a temperature of more than 100° C. However, the heat resistance of the ceramic coating layer 215, which is coated on the cathode active material layer 213 or anode active material layer 223 and integrated with the electrodes 210 and 220, is excellent. Thus, the ceramic coating layer 215 does not contract or melt when an internal short occurs even if the temperature is increased over 100° C. Moreover, when a polyolefin type film separator 230 made of PP or PE is damaged by an internal short, peripheral areas of the film are subsequently contracted or melted by initial heat generation at the time of the internal short. Thus, the burned or melted portion of the film separator 230 becomes wider, thereby causing a more severe increase of the short. However, in the electrode 210 including the ceramic coating layer 215, even if an internal short is generated, merely a small portion is damaged around the short, but the peripheral areas ceramic coating layer 215 do not contract or melt. Thus, the internal short portion does not expand.

In addition, a secondary battery having a high charge/discharge rate may be provided by including a ceramic powder of high porosity. The electrolytic solution injection speed is improved because the ceramic coating layer 215 quickly absorbs the electrolytic solution. Thus, productivity of the secondary battery can be improved. In addition, according after charge/discharge cycles, the electrolytic solution between the electrode plates may become decomposed and exhausted. The ceramic coating layer 215 having a high absorption property absorbs the electrolytic solution around it and supplies the electrolytic solution to the electrode. Thus, the lifetime of the battery is improved.

As noted above, the ceramic coating layer 215 may be used in place of a polyolefin type film separator 230 made of PP or PE. Alternatively, the polyolefin type film separator 230 and the ceramic coating layer 215 may be used together for improving safety.

The solvent forming the ceramic paste may include at least one selected from a group of NMP (N-methyl pyrrolidone), cyclohexanone, water, toluene and xylene. The solvent is totally evaporated in the drying process after the solvent functions as a dispersing medium for helping to disperse the ceramic powder and binder. Thus, the ceramic powder and binder forms the ceramic coating layer.

An optimum weight ratio of the ceramic powder to the binder may vary according to kinds of the ceramic powder and binder. The binder may be used in an amount that maintains a minimum adhesive force so as to prevent separation of the ceramic powder. For example, the binder may be used in an amount of less than 10 wt % of the total amount of the ceramic powder and binder. The binder is an organic material containing carbon and may be formed of rubber. As non-limiting examples, the binder may be one or more of the following compounds or a polymer formed therefrom: 2-ethylhexylacrylate, methoxymethyl acrylate, methyl acrylate, methoxyethylacrylate, ethylacrylate, ethoxyethylacrylate, propyl acrylate, butoxyethylacrylate, butyl acrylate, methoxyethoxyethyl acrylate, octylacrylate, vinyl methacrylate, vinyl acrylate, 2-chloroethylvinylether, allyl methacrylate, chloroacetic acid vinyl, dicyclopentenyloxyethyl acrylate, chloroacetic acid acrylate, 1,1-dimethylpropenylmethacrylate, chloromethyl styrene, 1,1-dimethylpropenylacrylate, glycidylacrylate, vinylglycidylether, acryl glycidyl ether, methacrylglycidylether, acrylic acid, maleic anhydride, acrylonitrile, methacrylic acid, 3,3-dimethylbutenylmethacrylate, itaconic acid divinyl, maleic anhydride divinyl, vinyl 1,1-dimethylpropenylether, vinyl 3,3-dimethylbutenylether, 1-acryloyloxy-1-phenylethene, 3,3-dimethylbutenylacrylate, and methyl methacrylate. As a specific, non-limiting example, the binder may be butyl acrylate. Typically, the binder may burn when the temperature of the secondary battery is increased over the decomposition temperature of the binder by generation of an internal short. Therefore, since the ceramic powder is an inorganic metal oxide and has heat resistance to temperatures higher than 1,000° C., it is desirable that the ceramic powder makes up more than 90 wt % of the total amount of the ceramic powder and binder.

Thus, the property of the ceramic paste is determined by the ceramic powder. The ceramic powder should be uniformly coated without defects for improving thermal stability of the secondary battery as described above. In other words, the ceramic powder should be coated with an even thickness on the electrode active material without defects such as uncoated parts, pin holes and crack.

Accordingly, the physical properties of the ceramic powder should be controlled. Flowability, stability and dispersibility of the ceramic paste are relevant considerations to be taken into account. The quality of the ceramic coating layer is affected by the properties described above.

The term "flowability" refers to a property showing an extent of movement of the paste that can be identified by viscosity. A low viscosity indicates a high flowability, and a high viscosity indicates a low flowability.

The term "stability" refers to the extent of uniform mixing of the ceramic powder, solvent and binder. If those are not uniformly mixed, layer separations respectively occur between the solvent and binder and ceramic powder, which can be identified by a settlement test. The settlement test is performed by putting the ceramic paste in a mess cylinder and then identifying changes of the layer separation after a predetermined time. Light materials float to the top layer and heavy materials settle in the lower layer. If the solvent, binder and ceramic powder are uniformly mixed, layer separations do not occur.

The term "dispersibility" refers to that the extent to which the ceramic powder is uniformly dispersed between the solvent and binder without clumping. If the ceramic powder is clumped and not dissolved, the ceramic powder forms large granules. Pin holes, stripes and granular projections may be generated by the presence of the large granule. The dispersibility can be measured by identifying granule sizes in the ceramic paste by using a gap gauge.

The physical properties as described above are affected by the specific surface area and particle size distribution of the ceramic powder. Accordingly, the lifetime and thermal stability of the secondary battery can be improved by controlling the specific surface area and particle size distribution of the ceramic powder.

As non-limiting examples, the specific surface area of the ceramic powder included in the ceramic coating layer may be more than $1.5 \text{ m}^2/\text{g}$ and less than $15.0 \text{ m}^2/\text{g}$. The particle size distribution of the ceramic powder may have a D10 value of more than 0.05 μm and a D90 value of less than 3.0 μm.

The term "specific surface area" refers to the entire surface area per unit weight, using $\text{m}^2/\text{g}$ as the units. Generally, when the specific surface area is large, the powder has a small particle diameter and is more porous. On the other hand, when the specific surface area is small, the powder has a large particle diameter and is less porous. Thus, the specific surface area and porosity are in inverse proportion to the particle size.

If the specific surface area of the ceramic powder is more than $15.0 \text{ m}^2/\text{g}$ when the binder of a predetermined amount is added, the viscosity of the paste is decreased because the binder is attached to wide surfaces of the particles and binder does not remain in the solvent of the ceramic paste. Thus, interfacial adhesive force between the ceramic coating layer and the active material layer or adhesive force between the particles of the ceramic powder is decreased when the ceramic coating layer is coated on the active material.

On the contrary, if the specific surface area of the ceramic powder is less than $1.5 \text{ m}^2/\text{g}$ when the binder of a predetermined amount is added, viscosity of the paste is increased because the binder remains in the solvent of the ceramic paste. Thus, when the ceramic coating layer is coated on the active material, the remaining binder is hardened to function as stress pulling the active material layer, thereby allowing adhesive force between the electrode collector and active material layer to be decreased. Thus, the specific surface area of the ceramic powder may be selected to be more than $1.5 \text{ m}^2/\text{g}$ and less than $15.0 \text{ m}^2/\text{g}$.

The viscosity of the ceramic paste may be 20 to 3000 cps. If the viscosity of the ceramic paste is less than 20 cps, coating may be difficult because of the low viscosity. If the viscosity of the ceramic paste is more than 3000 cps, coating may be difficult because of high viscosity.

In addition, if the particle size distribution has a D10 value of less than 0.05 μm, this indicates that many fine particles exist. If the fine particles exist in a large amount, the fine particles tend to clump with each other to form granules. Thus, it is difficult to form a uniformly dispersed paste. The viscosity of the paste is also increased because of the fine particles. In a worst case, the paste may be partially gelated over time. Granules are formed by clumping of the fine particles, and stripes are formed by the granules. Thus, the coating quality is degraded. In the worst case, when the gelated paste is coated, the thickness of the coating is uneven and many defects are generated.

On the other hand, if the particle size distribution has a D90 value of more than 3 μm, this indicates that large particles exist. When paste is formed of ceramic powder having the value of D90 more than 3 μm, large particles settle to a lower layer because of their high density. Thus, layer separation phenomenon occurs in the paste. Accordingly, the paste becomes unstable. In addition, the large particles form granules in themselves. Thus, the coating quality is lowered. Thus, the particle size distribution of the ceramic powder may have a D10 value of more than 0.05 μm and a D90 value of less than 3.0 μm.

The thickness distribution of the ceramic coating layer formed of the ceramic powder having the specific surface area and particle size distribution described above may be less than 10%. A smaller thickness distribution of the ceramic coating layer is more desirable. Thus, a lower limit value for the thickness distribution is not necessary.

As described above, in the electrode assembly and the secondary battery having the same, the ceramic powder can be coated on the electrode to uniform thickness without defects such as pin holes and cracks by controlling the specific surface area and particle size distribution of the ceramic powder. Accordingly, generation of an internal short is prevented by preventing current from being concentrated at defective portions. Thus, thermal decomposition of the active material and electrolytic solution and combustion or explosion of the secondary battery can be prevented.

In addition, the ceramic coating layer is coated in uniform thickness. Thus, the electrode plates are precisely formed in desired size when the electrode plates are wound in a jelly-roll type. In other words, it is possible to reduce probability that the ceramic coating layer is formed thinner than a desired thickness and thus an electrical short is generated when an external impact or vibration is applied. In addition, when the ceramic coating layer is formed too thick, it may not be possible to insert the electrode assembly into the can or it may be necessary to apply a strong external force to the electrode assembly. Thus, the jelly-roll type electrode assembly may be torn or scratched by the rim of the inlet of the can. However, the electrode assembly according to aspects described above can prevent damages as described above.

Physical properties of the ceramic powder will be explained in more detail according to experiments below.

According to the following Comparison Examples and Experimental Examples, the physical properties of a series of ceramic powders were measured, as well as physical properties of a ceramic paste formed from the ceramic powders and the physical properties of a ceramic coating layer formed from the ceramic paste. Comparison examples 1 to 16 relate to ceramic powders having small specific surface areas (not more than $1.50 \text{ m}^2/\text{g}$) or large specific surface areas (not less than $15.0 \text{ m}^2/\text{g}$). Experimental examples 1 to 16 relate to ceramic powders having specific surface areas within the range of more than $1.50 \text{ m}^2/\text{g}$ and less than $15.0 \text{ m}^2/\text{g}$.

First, ceramic pastes were prepared by mixing the ceramic powder with a binder (butyl acrylate) and a solvent (NMP), wherein the amount of the ceramic powder was 95 wt %, the amount of binder was 5 wt %, and the amount of solvent was 400 wt % of the weight of the ceramic powder and binder. Next, flowability, stability and dispersibility of each ceramic paste were measured, and then the ceramic coating layer was coated onto the active material layer of the anode plate and dried. The coating quality of the ceramic coating layer can be identified by thickness uniformity and formation of defects. In other words, the coating quality is good when the thickness is uniform and defects do not exist.

Batteries were constructed according to FIGS. 1 and 2, each having a ceramic coating layer formed by coating one of the ceramic pastes of the comparison examples or experimental examples on the both surfaces of the cathode. In all the examples, the positive active material layer 213 comprised $LiCoO_2$ and the negative active material layer 223 comprised graphite.

[Experiment 1]

In Experiment 1, the viscosity of a ceramic paste, layer separation, formation of granules, thickness uniformity of a ceramic coating layer and defects of the ceramic coating layer according to the specific surface area of ceramic powder were measured. Moreover, nail penetration tests, 150° C. penetration tests and bar crush tests were performed on batteries formed with the ceramic pastes. Table 1 shows the viscosity of ceramic paste, layer separation, formation of granules, thickness uniformity of the ceramic coating layer, defects of the ceramic coating layer and battery test results according to the specific surface area of the ceramic powder.

The specific surface area of the ceramic powder was measured by ASAP2020 surface analyzer from Micromeritics Co. (USA) using $N^2$ gas.

The viscosity (cps) of the ceramic paste was measured at 25° C. with a Brookfield (USA) DV-II+PRO viscometer at 50 rpm by using #62 spindle. When the measured viscosity of the ceramic paste was less than 20 cps, it was also noted that forming a coating with the ceramic paste was difficult. In such as case, the result was recorded as NG. Ceramic pastes having a viscosity of 20 through 3000 cps were suitable for forming a coating, and ceramic pastes having a viscosity within this range were marked as OK. When the viscosity of a ceramic paste was more than 3000 cps forming a coating was difficult, and the result was marked as NG.

To measure stability, 10 ml of the ceramic paste was put in a 10 ml mess cylinder. Then layer separation was identified by the naked eye after three days. When a height of a solvent layer floating at the top was more than 10% of a height of the entire ceramic paste, it was determined that there was layer separation. If layer separation did not occur, a ceramic paste was marked as OK, and when layer separation occurred, the ceramic paste was marked as NG. If a ceramic paste was gelated, the ceramic paste was marked as NG, even if the layer separation did not occur.

The ceramic paste was coated to a desired thickness by controlling a gap of a gap gauge. Then, the formation of ceramic paste granules was identified by the naked eye. If a stripe was formed in the coating by the presence of a granule larger than the gap of the gap gauge, the sample was marked as NG. If stripes did not exist, the sample was marked as OK.

The thickness uniformity of the ceramic coating layer was measured after the ceramic paste was coated onto a thin copper foil base material and then dried. A sample was marked as OK when the thickness distribution was less than 10%, and marked as NG when the thickness distribution was not less than 10%.

Pin holes, cracks, uncoated parts and stripes were defined as defects. A sample was marked as OK when an area of the defect was less than 5% of a normal area, and marked as NG when the area of the defect was not less than 5% of the normal area.

In the battery tests, the nail penetration test was conducted by overcharging the battery by 120% and penetrating the battery with a nail. Thirty batteries were tested for each example. If more than 24 batteries out of 30 did not explode, the result was marked as OK; otherwise, the result was marked as NG.

The 150° C. penetration test was conducted by charging a battery to 100%, heating the battery to 150° C. at a rate of 5° C./min and then leaving the battery at 150° C. for one hour. Thirty batteries were tested for each example. If more than 24 batteries out of 30 did not explode, the result was marked as OK; otherwise, the result was marked as NG.

The bar crush test was conducted by charging a battery to 100%, placing an iron bar having a diameter of 5 mm on the battery and dropping a 9 kN iron mass on the iron bar from a 1 m height. Thirty batteries were tested for each example. If more than 24 batteries out of 30 did not explode, the result was marked as OK; otherwise, the result was marked as NG.

TABLE 1

| | | BET | Ceramic paste | | | Ceramic layer | | | Battery | | |
|---|---|---|---|---|---|---|---|---|---|---|---|
| | | Surface | | stability | dispersibility | coating quality | | | | | |
| | Kind of ceramic | area ($m^2/g$) | flowability Viscosity | layer separation | formation of granule | thickness uniformity | defects | Nail Penetration | 150° C. Oven | Bar Crush |
| Comparison example 1 | alumina | 1.42 | 4800 | NG(gelated) | NG | NG | NG | NG | NG | NG |
| Comparison example 2 | alumina | 16.1 | 15 | NG | NG | NG | NG | NG | NG | NG |
| Comparison example 3 | zirconia | 1.31 | 6700 | NG(gelated) | NG | NG | NG | NG | NG | NG |
| Comparison example 4 | zirconia | 16.9 | 17 | NG | NG | NG | NG | NG | NG | NG |
| Comparison example 5 | barium titanate | 1.25 | 4300 | NG(gelated) | NG | NG | NG | NG | NG | NG |
| Comparison example 6 | barium titanate | 15.4 | 6 | NG | NG | NG | NG | NG | NG | NG |
| Comparison example 7 | magnesia | 1.27 | 3400 | NG(gelated) | NG | NG | NG | NG | NG | NG |
| Comparison example 8 | magnesia | 15.7 | 16 | NG | NG | NG | NG | NG | NG | NG |
| Comparison example 9 | zeolite | 1.41 | 5600 | NG(gelated) | NG | NG | NG | NG | NG | NG |
| Comparison example 10 | zeolite | 19.3 | 17 | NG | NG | NG | NG | NG | NG | NG |
| Comparison example 11 | titanium oxide | 1.35 | 3300 | NG(gelated) | NG | NG | NG | NG | NG | NG |
| Comparison example 12 | titanium oxide | 17.5 | 18 | NG | NG | NG | NG | NG | NG | NG |
| Comparison example 13 | alumina + zirconia | 1.2 | 4200 | NG(gelated) | NG | NG | NG | NG | NG | NG |

TABLE 1-continued

| | Kind of ceramic | BET Surface area (m²/g) | Ceramic paste | | | Ceramic layer | | Battery | | |
|---|---|---|---|---|---|---|---|---|---|---|
| | | | flowability Viscosity | stability layer separation | dispersibility formation of granule | coating quality thickness uniformity | defects | Nail Penetration | 150° C. Oven | Bar Crush |
| Comparison example 14 | alumina + zirconia | 18.2 | 8 | NG | NG | NG | NG | NG | NG | NG |
| Comparison example 15 | Barium titanate + magnesia | 1.43 | 3500 | NG(gelated) | NG | NG | NG | NG | NG | NG |
| Comparison example 16 | Barium titanate + magnesia | 17.9 | 15 | NG | NG | NG | NG | NG | NG | NG |
| Experimental example 1 | alumina | 4.5 | 600 | OK | OK | OK | OK | OK | OK | OK |
| Experimental example 2 | alumina | 8.8 | 450 | OK | OK | OK | OK | OK | OK | OK |
| Experimental example 3 | zirconia | 3.8 | 550 | OK | OK | OK | OK | OK | OK | OK |
| Experimental example 4 | zirconia | 10.5 | 200 | OK | OK | OK | OK | OK | OK | OK |
| Experimental example 5 | barium titanate | 5.5 | 1000 | OK | OK | OK | OK | OK | OK | OK |
| Experimental example 6 | barium titanate | 11.2 | 700 | OK | OK | OK | OK | OK | OK | OK |
| Experimental example 7 | magnesia | 2.6 | 2900 | OK | OK | OK | OK | OK | OK | OK |
| Experimental example 8 | magnesia | 13.7 | 2500 | OK | OK | OK | OK | OK | OK | OK |
| Experimental example 9 | zeolite | 4.6 | 1200 | OK | OK | OK | OK | OK | OK | OK |
| Experimental example 10 | zeolite | 9.7 | 870 | OK | OK | OK | OK | OK | OK | OK |
| Experimental example 11 | titanium oxide | 5.8 | 100 | OK | OK | OK | OK | OK | OK | OK |
| Experimental example 12 | titanium oxide | 11.4 | 20 | OK | OK | OK | OK | OK | OK | OK |
| Experimental example 13 | alumina + zirconia | 4.7 | 180 | OK | OK | OK | OK | OK | OK | OK |
| Experimental example 14 | alumina + zirconia | 12.3 | 40 | OK | OK | OK | OK | OK | OK | OK |
| Experimental example 15 | Barium titanate + magnesia | 3.5 | 620 | OK | OK | OK | OK | OK | OK | OK |
| Experimental example 16 | Barium titanate + magnesia | 14.7 | 230 | OK | OK | OK | OK | OK | OK | OK |

Referring to Table 1, when the ceramic powders having small specific surface areas (not more than 1.50 m²/g) or large specific surface areas (not less than 15.0 m²/g) were used in the comparison examples 1 to 16, physical properties of the pastes were not good, and thus the coating quality was undesirable.

On the contrary, physical properties and coating quality of the pastes in the experimental examples 1 to 16, having specific surface areas of more than 1.5 m²/g and less than 15.0 m²/g, were good.

[Experiment 2]

In the experiment 2, the viscosity of ceramic pastes, layer separation, formation of granules, thickness uniformity of a ceramic coating layer and defects of the ceramic coating layer according to particle size distribution of ceramic powder were measured. Moreover, nail penetration tests, 150° C. penetration tests and bar crush tests as described above were performed on batteries formed with the ceramic pastes. Table 2 shows the viscosity of ceramic paste, layer separation, formation of granules, thickness uniformity of the ceramic coating layer, defects of the ceramic coating layer and battery test results according to the particle size distribution of the ceramic powder.

The particle size distribution of the ceramic powder was measured by an HRA model particle size distribution analyzer from Microtrack company (Japan). D10 and D90 values respectively indicate particle size distributions of relative particle contents of 10% and 90%. Measurement conditions for the viscosity of ceramic paste, layer separation, formation of granules, thickness uniformity of the ceramic coating layer and defects of the ceramic coating layer were the same as the Experiment 1.

TABLE 2

| | | | | Ceramic paste | | | Ceramic layer coating quality | | Battery | | |
|---|---|---|---|---|---|---|---|---|---|---|---|
| | | | | stability | | dispersibility | | | | | |
| | Kind of ceramic | D10 (um) | D90 (um) | flowability Viscosity | layer separation | formation of granule | thickness uniformity | defects | Nail Penetration | 150° C. Oven | Bar Crush |
| Comparison example 17 | alumina | 0.03 | 1.0 | 3500 | NG(gelated) | NG | NG | NG | NG | NG | NG |
| Comparison example 18 | alumina | 0.06 | 3.5 | 2300 | NG | NG | NG | NG | NG | NG | NG |
| Comparison example 19 | zirconia | 0.04 | 1.0 | 3700 | NG(gelated) | NG | NG | NG | NG | NG | NG |
| Comparison example 20 | zirconia | 0.06 | 3.6 | 2000 | NG | NG | NG | NG | NG | NG | NG |
| Comparison example 21 | barium titanate | 0.02 | 1.0 | 6700 | NG(gelated) | NG | NG | NG | NG | NG | NG |
| Comparison example 22 | barium titanate | 0.06 | 4.5 | 1200 | NG | NG | NG | NG | NG | NG | NG |
| Comparison example 23 | magnesia | 0.01 | 1.0 | 5000 | NG(gelated) | NG | NG | NG | NG | NG | NG |
| Comparison example 24 | magnesia | 0.06 | 4.7 | 570 | NG | NG | NG | NG | NG | NG | NG |
| Comparison example 25 | zeolite | 0.05 | 1.0 | 4700 | NG(gelated) | NG | NG | NG | NG | NG | NG |
| Comparison example 26 | zeolite | 0.06 | 3.7 | 460 | NG | NG | NG | NG | NG | NG | NG |
| Comparison example 27 | titanium oxide | 0.04 | 1.0 | 3200 | NG(gelated) | NG | NG | NG | NG | NG | NG |
| Comparison example 28 | titanium oxide | 0.06 | 5.5 | 160 | NG | NG | NG | NG | NG | NG | NG |
| Comparison example 29 | zeolite + titanium oxide | 0.04 | 1.0 | 3200 | NG(gelated) | NG | NG | NG | NG | NG | NG |
| Comparison example 30 | zeolite + titanium oxide | 0.06 | 3.9 | 1600 | NG | NG | NG | NG | NG | NG | NG |
| Comparison example 31 | barium titanate + zirconia | 0.05 | 1.0 | 4200 | NG(gelated) | NG | NG | NG | NG | NG | NG |
| Comparison example 32 | barium titanate + zirconia | 0.06 | 4.1 | 280 | NG | NG | NG | NG | NG | NG | NG |
| Experimental example 17 | alumina | 0.12 | 2.0 | 750 | OK | OK | OK | OK | OK | OK | OK |
| Experimental example 18 | alumina | 0.15 | 2.5 | 500 | OK | OK | OK | OK | OK | OK | OK |
| Experimental example 19 | zirconia | 0.22 | 1.0 | 600 | OK | OK | OK | OK | OK | OK | OK |
| Experimental example 20 | zirconia | 0.15 | 1.8 | 250 | OK | OK | OK | OK | OK | OK | OK |
| Experimental example 21 | barium titanate | 0.25 | 1.0 | 120 | OK | OK | OK | OK | OK | OK | OK |
| Experimental example 22 | barium titanate | 0.15 | 2.9 | 240 | OK | OK | OK | OK | OK | OK | OK |
| Experimental example 23 | magnesia | 0.32 | 2.0 | 1500 | OK | OK | OK | OK | OK | OK | OK |
| Experimental example 24 | magnesia | 0.15 | 2.7 | 1200 | OK | OK | OK | OK | OK | OK | OK |
| Experimental example 25 | zeolite | 0.42 | 1.0 | 1000 | OK | OK | OK | OK | OK | OK | OK |
| Experimental example 26 | zeolite | 0.15 | 2.8 | 2500 | OK | OK | OK | OK | OK | OK | OK |
| Experimental example 27 | titanium oxide | 0.52 | 1.0 | 2800 | OK | OK | OK | OK | OK | OK | OK |
| Experimental example 28 | titanium oxide | 0.15 | 2.6 | 1500 | OK | OK | OK | OK | OK | OK | OK |
| Experimental example 29 | zeolite + titanium oxide | 0.42 | 1.0 | 750 | OK | OK | OK | OK | OK | OK | OK |
| Experimental example 30 | zeolite + titanium oxide | 0.15 | 2.1 | 600 | OK | OK | OK | OK | OK | OK | OK |
| Experimental example 31 | barium titanate + zirconia | 0.25 | 1.0 | 340 | OK | OK | OK | OK | OK | OK | OK |
| Experimental example 32 | barium titanate + zirconia | 0.15 | 2.0 | 420 | OK | OK | OK | OK | OK | OK | OK |

Comparison examples 17, 19, 21, 23, 25, 27, 29 and 31 relate to ceramic powders having a D10 particle size distribution of not more than 0.05 μm, and Comparison examples 18, 20, 22, 24, 26, 28, 30 and 32 relate to ceramic particles having a D90 particle size distribution of not less than 3 μm. Experimental examples 17 to 32 relate to ceramic powders having a D10 value of more than 0.05 μm and a D90 value of less than 3 μm.

Referring to Table 2, when the D10 value was less than 0.05 μm or the D90 value was more than 3 μm in C comparison examples 17 to 32, physical properties of the pastes were not good, and thus, the coating quality was undesirable.

On the contrary, the physical properties and coating quality of the pastes were good in the experimental examples 17 to 32.

[Experiment 3]

In the experimental example 3, the viscosity of ceramic pastes, layer separation, formation of granules, thickness uniformity of a ceramic coating layer and defects of the ceramic coating layer according to specific surface area and particle size distribution of ceramic powders were measured. Moreover, nail penetration tests, 150° C. penetration tests and bar crush tests were performed on batteries formed with the ceramic pastes. The results are shown in Table 3.

TABLE 3

|  | Kind of ceramic | BET Surface area (m²/g) | D10 (um) | D90 (um) | Ceramic paste | | | Ceramic layer coating quality | | Battery | | |
|---|---|---|---|---|---|---|---|---|---|---|---|---|
|  |  |  |  |  | flowability Viscosity | layer separation | dispersibility formation of granule | thickness uniformity | defects | Nail Penetration | 150° C. Oven | Bar Crush |
| Comparison example 33 | alumina | 1.3 | 0.01 | 3.4 | 10 | NG | NG | NG | NG | NG | NG | NG |
| Comparison example 34 | alumina | 16.0 | 0.04 | 4.5 | 15 | NG | NG | NG | NG | NG | NG | NG |
| Comparison example 35 | zirconia | 1.4 | 0.02 | 3.1 | 3500 | NG | NG | NG | NG | NG | NG | NG |
| Comparison example 36 | zirconia | 15.8 | 0.04 | 3.5 | 4000 | NG | NG | NG | NG | NG | NG | NG |
| Comparison example 37 | barium titanate | 1.2 | 0.05 | 3.6 | 7000 | NG | NG | NG | NG | NG | NG | NG |
| Comparison example 38 | barium titanate | 16.7 | 0.02 | 4.5 | 6500 | NG | NG | NG | NG | NG | NG | NG |
| Comparison example 39 | magnesia | 1.1 | 0.03 | 3.7 | 5 | NG | NG | NG | NG | NG | NG | NG |
| Comparison example 40 | magnesia | 18.2 | 0.01 | 4.7 | 18 | NG | NG | NG | NG | NG | NG | NG |
| Comparison example 41 | zeolite | 1.2 | 0.05 | 3.2 | 4500 | NG | NG | NG | NG | NG | NG | NG |
| Comparison example 42 | zeolite | 15.9 | 0.02 | 4.6 | 5000 | NG | NG | NG | NG | NG | NG | NG |
| Comparison example 43 | titanium oxide | 1.0 | 0.03 | 3.0 | 6 | NG | NG | NG | NG | NG | NG | NG |
| Comparison example 44 | titanium oxide | 17.2 | 0.04 | 3.1 | 13 | NG | NG | NG | NG | NG | NG | NG |
| Comparison example 45 | alumina + zeolite | 6.5 | 0.23 | 1.9 | 300 | NG | NG | NG | NG | NG | NG | NG |
| Comparison example 46 | alumina + zeolite | 14.9 | 0.35 | 2.7 | 240 | NG | NG | NG | NG | NG | NG | NG |
| Comparison example 47 | magnesia + titanium oxide | 7.7 | 0.25 | 2.9 | 160 | NG | NG | NG | NG | NG | NG | NG |
| Comparison example 48 | magnesia + titanium oxide | 12.5 | 0.18 | 2.0 | 220 | NG | NG | NG | NG | NG | NG | NG |
| Experimental example 33 | alumina | 1.5 | 0.06 | 2.0 | 120 | OK | OK | OK | OK | OK | OK | OK |
| Experimental example 34 | alumina | 11.5 | 0.15 | 2.5 | 250 | OK | OK | OK | OK | OK | OK | OK |
| Experimental example 35 | zirconia | 3.7 | 0.09 | 1.0 | 300 | OK | OK | OK | OK | OK | OK | OK |
| Experimental example 36 | zirconia | 10.5 | 0.22 | 1.8 | 340 | OK | OK | OK | OK | OK | OK | OK |
| Experimental example 37 | barium titanate | 5.5 | 0.11 | 1.0 | 270 | OK | OK | OK | OK | OK | OK | OK |
| Experimental example 38 | barium titanate | 7.8 | 0.25 | 2.9 | 500 | OK | OK | OK | OK | OK | OK | OK |
| Experimental example 39 | magnesia | 5.7 | 0.08 | 2.0 | 22 | OK | OK | OK | OK | OK | OK | OK |
| Experimental example 40 | magnesia | 14.3 | 0.25 | 2.7 | 25 | OK | OK | OK | OK | OK | OK | OK |
| Experimental example 41 | zeolite | 2.5 | 0.12 | 1.0 | 2500 | OK | OK | OK | OK | OK | OK | OK |
| Experimental example 42 | zeolite | 14.9 | 0.35 | 2.8 | 2900 | OK | OK | OK | OK | OK | OK | OK |
| Experimental example 43 | titanium oxide | 7.6 | 0.12 | 1.0 | 30 | OK | OK | OK | OK | OK | OK | OK |

TABLE 3-continued

| | | | | | Ceramic paste | | | | | Battery | | |
| | | BET Surface area ($m^2/g$) | D10 (um) | D90 (um) | flowability Viscosity | stability layer separation | dispersibility formation of granule | Ceramic layer coating quality | | | | |
| | Kind of ceramic | | | | | | | thickness uniformity | defects | Nail Penetration | 150° C. Oven | Bar Crush |
|---|---|---|---|---|---|---|---|---|---|---|---|---|
| Experimental example 44 | titanium oxide | 14.8 | 0.17 | 2.6 | 40 | OK | OK | OK | OK | OK | OK | OK |
| Experimental example 45 | alumina + zeolite | 6.5 | 0.23 | 1.9 | 300 | OK | OK | OK | OK | OK | OK | OK |
| Experimental example 46 | alumina + zeolite | 14.9 | 0.35 | 2.7 | 240 | OK | OK | OK | OK | OK | OK | OK |
| Experimental example 47 | magnesia + titanium oxide | 7.7 | 0.25 | 2.9 | 160 | OK | OK | OK | OK | OK | OK | OK |
| Experimental example 48 | magnesia + titanium oxide | 12.5 | 0.18 | 2.0 | 220 | OK | OK | OK | OK | OK | OK | OK |

Comparison examples 33 to 48 relate to ceramic powders having specific surface areas not more than 1.5 $m^2/g$ or not less than 15.0 $m^2/g$, and particle size distribution values of D10 not more than 0.05 μm or D90 not less than 3 μm.

Experimental examples 33 to 48 relate to ceramic powders having specific surface areas more than 1.5 $m^2/g$ and less than 15 $m^2/g$, and the particle size distribution values of D10 more than 0.05 μm or D90 less than 3 μm.

Referring to Table 3, it was identified that the range of desirable physical properties and coating quality of the paste was not narrowed even if both of the specific surface area and particle size distribution of the ceramic powder were simultaneously limited. In other words, in the particle size distribution of the ceramic powder, a combination of a D10 value of more than 0.05 μm and a D90 value of less than 3 μm corresponds to a specific surface area of more than 1.5 $m^2/g$ and less than 15 $m^2/g$. That is the reason that the particle size distribution of the ceramic powder is in inverse proportion to the specific surface area. It was identified that the specific surface area and particle size distribution independently determined the physical properties and coating quality of the ceramic paste. In other words, a ceramic powder having a specific surface area within the described specific surface area limits also had a particle size distribution within the described particle size distribution limits.

As described above, the electrode assembly and secondary battery including the electrode assembly according to aspects of the present invention produces the following effects. The ceramic powder can be coated onto the electrode to a uniform thickness without defects such as pin holes and cracks by controlling the specific surface area and particle size distribution of the ceramic powder. Moreover, the ceramic coating layer is formed on the electrode in a uniform thickness without defects. Thus, expansion of internal short circuits can be prevented by preventing current from being concentrated at defective portions even when the separator melts to cause an internal short. Moreover, thermal decomposition of the active material and electrolytic solution and combustion or explosion of the secondary battery can be prevented by preventing expansion of the internal short.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode assembly, comprising:
a cathode including a cathode active material layer;
an anode including an anode active material layer; and
a ceramic coating layer formed on at least one of the active material layers of the cathode and anode, the ceramic coating layer including a ceramic powder and a binder,
wherein the specific surface area of the ceramic powder is more than 1.5 $m^2/g$ and less than 15.0 $m^2/g$, and
wherein the amount of the binder is less than 10 weight % of the total amount of the binder and ceramic powder; and wherein the amount of the ceramic powder is more than 90 weight % of the total amount of the binder and ceramic powder.

2. The electrode assembly of claim 1, wherein the ceramic coating layer is formed by coating a ceramic paste comprising the ceramic powder, the binder and a solvent onto at least one of the cathode or anode.

3. The electrode assembly of claim 2, wherein the viscosity of the ceramic paste is 20 to 3,000 cps.

4. The electrode assembly of claim 1, wherein a thickness distribution of the ceramic coating layer is less than 10%.

5. The electrode assembly of claim 1, wherein the binder is an acrylate group rubber.

6. The electrode assembly of claim 1, further including a polyolefin film separator between the anode and the cathode.

7. The electrode assembly of claim 1, wherein the electrode assembly does not have a polyolefin film separator between the anode and the cathode.

8. The electrode assembly of claim 1, wherein the electrode assembly is wound in a jelly-roll configuration, and wherein the ceramic coating layer is formed on outer surfaces of the cathode and the anode.

9. The electrode assembly of claim 1, wherein the electrode assembly is wound in a jelly-roll configuration, and wherein the ceramic coating layer is formed on inner surfaces of the cathode and the anode.

10. The electrode assembly of claim 1, wherein the electrode assembly is wound in a jelly-roll configuration, and wherein the ceramic coating layer is formed on both an inner surface and an outer surface of one of the cathode and the anode.

11. A secondary battery, comprising:
the electrode assembly according to claim 1;
a can that receives the electrode assembly; and
a cap assembly that seals the can.

12. An electrode assembly, comprising:
a cathode comprising a cathode active material layer;
an anode comprising an anode active material layer; and
a ceramic coating layer formed on at least one of the active material layers of the cathode and anode, the ceramic coating layer including ceramic powder and a binder,
wherein the particle size distribution of the ceramic powder has a D10 value of more than 0.05 μm and a D90 value of less than 3.0 μm, and
wherein the amount of the binder is less than 10 weight % of the total amount of the binder and ceramic powder;
and wherein the amount of the ceramic powder is more than 90 weight % of the total amount of the binder and ceramic powder.

13. The electrode assembly of claim 12, wherein the ceramic coating layer is formed by coating a ceramic paste comprising the ceramic powder, the binder and a solvent onto at least one of the cathode or anode.

14. The electrode assembly of claim 13, wherein the viscosity of the ceramic paste is 20 to 3,000 cps.

15. The electrode assembly of claim 12, wherein a thickness distribution of the ceramic coating layer is less than 10%.

16. The electrode assembly of claim 12, wherein the binder is an acrylate group rubber.

17. A secondary battery, comprising:
the electrode assembly according to claim 12;
a can that receives the electrode assembly; and
a cap assembly that seals the can.

18. An electrode assembly, comprising:
a cathode comprising a cathode active material layer;
an anode comprising an anode active material layer; and
a ceramic coating layer, formed on at least one of the active material layers of the cathode and anode, the ceramic coating layer including a ceramic powder and a binder,
wherein the specific surface area of the ceramic powder is more than $1.5 \ m^2/g$ and less than $15.0 \ m^2/g$; and
wherein the particle size distribution of the ceramic powder has a D10 value of more than 0.05 μm and a D90 value of less than 3.0 μm, and
wherein the amount of the binder is less than 10 weight % of the total amount of the binder and ceramic powder;
and wherein the amount of the ceramic powder is more than 90 weight % of the total amount of the binder and ceramic powder.

19. A secondary battery, comprising:
an electrode assembly;
a can that receives the electrode assembly; and
a cap assembly that seals the can,
wherein the electrode assembly comprises:
a cathode comprising a cathode active material layer,
an anode comprising an anode active material layer, and
a ceramic coating layer formed on at least one of the active material layers of the cathode and anode, the ceramic coating layer including ceramic powder and a binder,
wherein the specific surface area of the ceramic powder is more than $1.5 \ m^2/g$ and less than $15.0 \ m^2/g$; and
wherein particle size distribution of the ceramic powder has a D10 value of more than 0.05 μm and a D90 value of less than 3.0 μm, and
wherein the amount of the binder is less than 10 weight % of the total amount of the binder and ceramic powder;
and wherein the amount of the ceramic powder is more than 90 weight % of the total amount of the binder and ceramic powder.

* * * * *